July 24, 1928.
E. WARD
LOCK WASHER
Filed Nov. 11, 1926
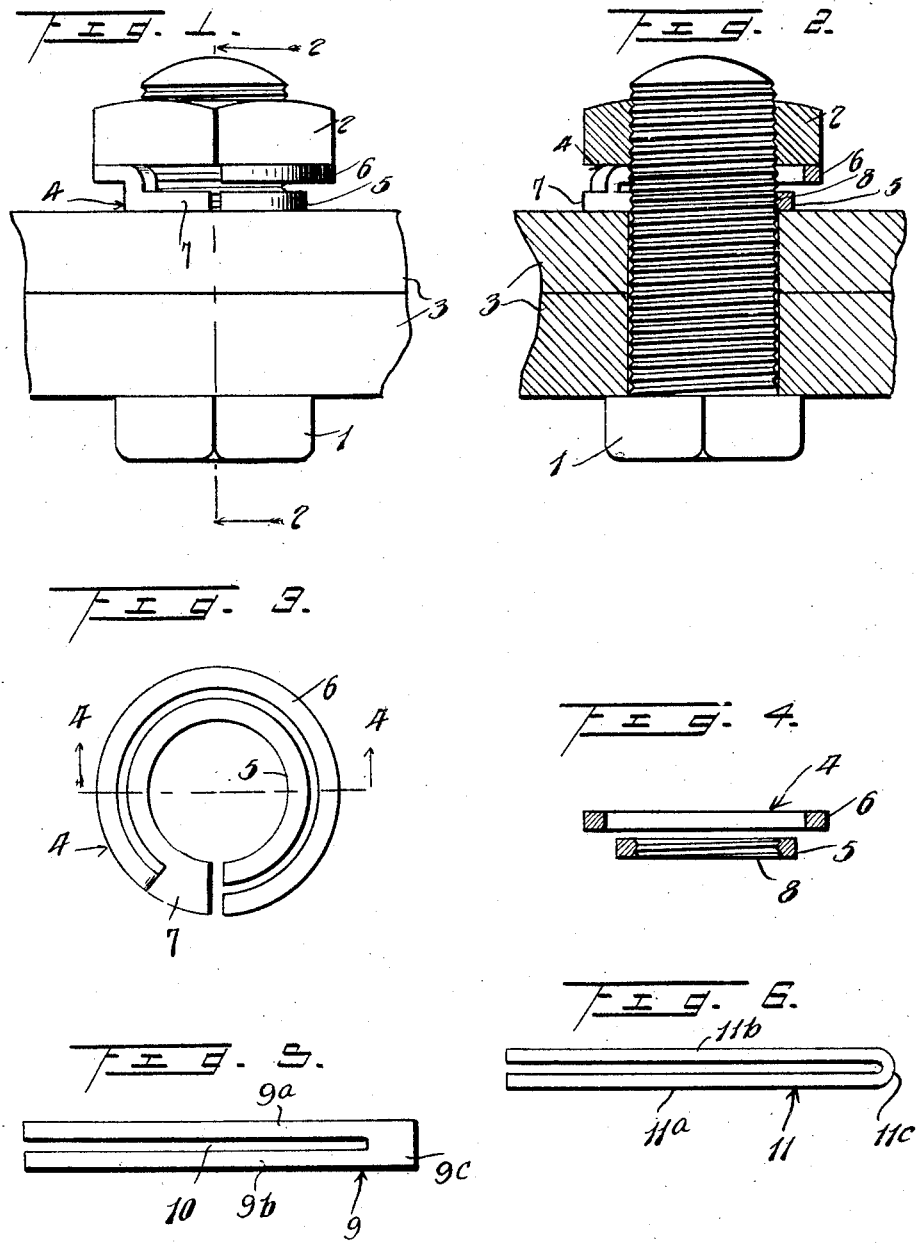
Inventor
E. Ward.
Attorney Patented July 24, 1928.

1,678,409

UNITED STATES PATENT OFFICE.

ERNEST WARD, OF INDEPENDENCE, MISSOURI.

LOCK WASHER.

Application filed November 11, 1926. Serial No. 147,767.

This invention relates to nut locking washers, and comprehends a device of this character which shall be inexpensive to manufacture and highly efficient in use and which shall embody an annular member adapted to have threaded engagement with the bolt and an annular member adapted to frictionally contact with the nut, the members being elastic and split and connected at similar ends.

The invention is hereinafter more fully described and claimed, and illustrated in the accompanying drawing, wherein:

Figure 1 is an elevational view illustrating the application of the lock washer, Figure 2 is a sectional view taken on the plane indicated by the line 2—2 on Figure 1, Figure 3 is a plan view of the lock washer, Figure 4 is a sectional view taken on the plane indicated by the line 4—4 of Figure 3, Figure 5 is a plan view of the blank from which the lock washer is formed, and Figure 6 is a plan view of a slightly modified form of the blank.

Referring to the drawing by reference numerals, 1 designates a bolt, 2 the nut of the bolt, 3 parts connected by the bolt, and 4 the lock washer.

The lock washer 4 comprises split and elastic annular members 5 and 6 arranged in spaced parallel relation. The external diameter of the member 5 is smaller than the internal diameter of the member 6, and is provided with a lug 7 extending radially outward from one end thereof. The member 6 is provided with an angular terminal connected to the lug 7 radially beyond the member 5. The member 5 is provided with a single or double screw thread 8.

The lock washer 4 is made from the blank 9 shown in Figure 5. The blank 9 consists of a strip of any suitable elastic metal and is slotted as shown at 10. When the blank 9 is bent to form the lock washer 4, the parts $9^a$, $9^b$ and $9^c$ form the members 5, 6 and 7, respectively, of the lock washer. If desired, the lock washer 4 may be made from the blank 11 shown in Figure 6 and consisting of a U-shaped piece of any suitable elastic metal. When this blank is bent to form the lock washer 4, the parts $11^a$, $11^b$ and $11^c$ thereof form the members 5, 6 and 7, respectively, of the lock washer.

In practice, the lock washer 4 is applied to the bolt 1 between the nut 2 and the parts 3 with the member 5 in engagement with the bolt and the member 6 in contact with the nut. During the application of the lock washer 4, the tension of the member 5 is developed, and during the application of the nut 2 the tension of the member 6 is developed, with the result that the member 5 is engaged with the bolt 1 and the member 6 contacts with the nut 2 under such pressure as to hold the lock washer 4 and the nut against casual movement with respect to the bolt. The tension of the member 5 is developed in a radial direction and the tension of the member 6 in an axial direction.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

A lock washer comprising a split elastic annular member internally screw threaded and provided with a lug extending radially outward from one end thereof, and a second split elastic annular member having an internal diameter greater than the external diameter of said first member, and having an angular terminal connected to said lug outwardly beyond said first member.

In testimony whereof I affix my signature.

ERNEST WARD.